Figure 1:
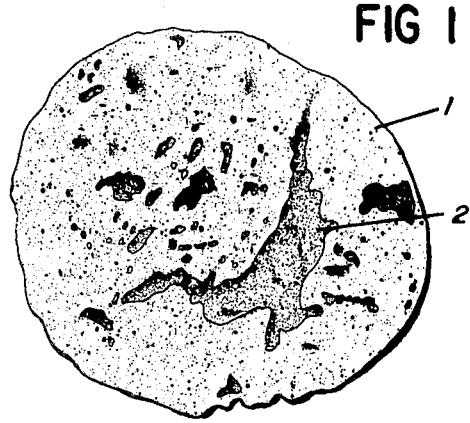

March 1, 1966  TAKAO SASABE  3,238,039
PROCESS FOR SEPARATING NON-MOLTEN SLAG FROM
NICKEL CHROMIUM-CONTAINING IRON ORES
Filed July 22, 1964

Takao Sasabe
INVENTOR

BY *Wenderoth,*
*Lind & Ponack,* ATTORNEYS

United States Patent Office 3,238,039
Patented Mar. 1, 1966

3,238,039
PROCESS FOR SEPARATING NON-MOLTEN SLAG FROM NICKEL CHROMIUM-CONTAINING IRON ORES
Takao Sasabe, Musashino, Tokyo, Japan, assignor to Yawata Iron & Steel Co., Ltd., Tokyo, Japan
Filed July 22, 1964, Ser. No. 384,366
2 Claims. (Cl. 75—31)

The present invention is a continuation-in-part of my copending patent application Serial No. 153,883 filed November 21, 1961 and now abandoned.

This invention relates to a process for obtaining chromium free metallic iron by preferentially reducing only the iron oxide contained in nickel chromium iron ores and separating the non-molten slag.

A typical nickel chromium-containing iron ore is a weathered product of serpentine called laterite. Its chemical composition is 40 to 60% M. Fe, 1 to 4% Cr, 0.3 to 1% Ni, 4 to 8% $Al_2O_3$, 1 to 3% $SiO_2$, 8 to 15% $H_2O$, a slight amount of Mn and S and a very slight amount of P and Cu. The iron is mainly in the form of brown iron ore ($Fe_2O_3 \cdot H_2O$) and all the chromium exists as chromium iron ore ($FeO \cdot Cr_2O_3$). According to particle separating tests, the particles of such a chromium iron ore are mostly in the form of a comparatively large granularity but are so brittle as to easily become granular. Further, the brown iron ore is muddy and consists of very small particles which are adsorbed on the surface of the chromium iron ore particles. Therefore, it is very difficult to dress both of these ores by gravity dressing or any other physical dressing method.

Known methods for extracting chromium from nickel chromium-containing iron ores are as follows:

(1) An alkali roasting method wherein a powdery Ni-Cr-containing iron ore is mixed with soda ash and lime and the mixture roasted so that the chromium content is extracted as a chromate.

(2) A method wherein a powdery Ni-Cr-containing iron ore is mixed with a reducing carbon material and lime and is melted and reduced in an electric furnace to obtain ferrochromium which is then electrolyzed as an anode.

(3) A method wherein chlorine gas is passed through a powdery Ni-Cr-containing iron ore in the presence of a reducing carbon material and the chromium is extracted as a chloride.

In addition, it is known to separate chromium from molten pig iron by adjusting the temperature of molten pig-iron in a shaft furnace, by a special blowing procedure, to less than about 1350° C. Each of the three processes described supra adds an additive to the nickel chromium-containing iron ore while the last process described above separates the chromium from molten pig-iron after melting of the iron ore.

When a nickel chromium-containing iron ore is heated and melted, the chromium oxide contained in the ore will melt into said molten iron and the subsequent dechromating treatment will become very difficult, however, I have discovered that, in the later mentioned specific temperature range, the chromium oxide contained in the nickel chromium-containing iron ore will move into the slag in an unreduced state but when said specific temperature is exceeded, the chromium together with other impurities will be reduced and will move into metallic iron.

I have also discovered that, when the nickel chromium-containing iron ore per se is molded into pellets of proper size and is heated and reduced and the temperature is then elevated, the pellets will be sintered and the reduction will be accelerated but, if said pellets are taken out and examined just before they are melted, it is found that the pellets are in the form of hollow balls having an outer crust made of reduced iron in the sintered state and an inner crust attached to said outer crust which does not contain any reduced iron but is composed mainly of slag. I have therefore found that, when these spherical iron pellets are crushed finely, only metallic iron is easily separated and obtained from the slag by magnetic dressing.

An object of the present invention is to provide a process wherein a nickel chromium-containing iron ore is molded into pellets and is treated at a specific temperature and the slag produced thereby is separated in a non-molten state so that the chromium may be removed.

Another object of the present invention is to provide a process wherein a slag forming agent is further added so that the composition of the slag produced in the above mentioned process may be adjusted to be adapted to the extraction of alumina and the production of alumina cement and the slag is separated in a non-molten state so that the chromium may be removed.

Still another object of the present invention is to provide a process wherein the chromium originally contained in iron ores may be completely removed by crushing the pellets, obtained according to the present invention, to coarse grains which are then subjected to a magnetic separation.

Figure 2:
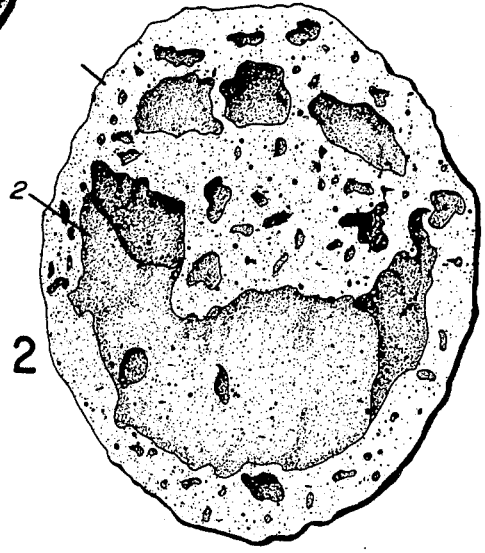
Figure 3:
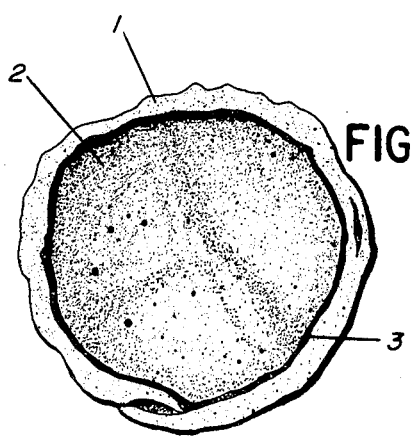

FIGURES 1 to 3 are sketches of photographs and explanatory views of iron balls (pellets) reduced under various temperature conditions. FIGURES 1 and 2 show the unfavorable results obtained under insufficient heating conditions while FIGURE 3 shows the good result obtained under the heating conditions specified by the present invention.

The inventor has found that when a nickel chromium-containing iron ore is molded into pellets and these pellets are heated under the heating conditions specified by the present invention, while reducing the same by using a reducing agent, up to a temperature below the critical temperature at which reduced metallic iron will be fused by melting, hollow balls are formed having an outer crust of metallic iron and inner layer of slag attached to the inside of said outer crust in each ball, said slag containing substantially all the chromium originally contained in said iron ores. That is to say, by heating and reducing the pellets made from nickel chromium-containing iron ores under heating conditions specified by the present invention, the iron oxide is reduced and forms an outer crust of metallic iron, the nickel oxide is also reduced and enters the outer crust, but the chromium oxide remains unreduced and enters the slag which forms an inner layer attached to the inside of said outer crust of metallic iron. The center of each ball is hollow. The thus formed hollow balls are crushed and may be readily separated into metallic iron and non-molten slag by subjecting the crushed ore to a magnetic dressing.

The crux of the present invention resides in that by selectively reducing only the iron oxide metallic iron is concentrated in the outer crust of each ball (pellet) and may be easily separated from the chromium which remains unreduced and mixed with slag forming the inner layer attached to said outer crust. When the pellets are subjected to a heating and reducing treatments, the pellets at first become sponge iron balls in which all the components are mingled with each other, and when these balls are further heated according to the heating conditions specified by the present invention, reduced iron oxide, that is, metallic iron, is separated from the slag which contains unreduced chromium oxide, and the slag and the reduced iron unite in separate layers to form pellets having a large void in the center.

It is known that when an iron ore is heated with an appropriate reducing agent, such as a carbon material, the reducing action will be gradually accelerated from about 500° C.

The present invention is based inter alia on the discovery that when pellets molded from a nickel chromium-containing iron ore are heated at a certain temperature gradient as specified by the present invention the reducing reaction will be greatest near about 1400° C.

In the above reducing reaction it has been discovered that by regulating the temperature gradient, that is, heating time and temperature between room temperature and before the critical point at which metallic iron is fused by melting, the iron oxide is reduced to metallic iron, the nickel and cobalt components in the iron ore are reduced before the iron and become mixed with the metallic iron, but the chromium oxide remains unreduced and becomes admixed with the slag, such admixture forming a thin layer attached to the inner surface of an outer crust consisting of metallic iron.

Therefore, at the time when the chromium oxide contained in the nickel chromium-containing iron ore has moved unreduced into the slag, if the pellets are removed from the reducing oven and cooled and crushed, removing the chromium which has been sonsidered to be very difficult, is easily attained by means of a magnetic dressing.

By making such hollow balls having an outer crust consisting of metallic iron and an inner layer consisting of slag attached to said outer crust removal of chromium is easier than by crushing and magnetically dressing the sponge iron balls, in which metallic iron and slag are mixed together.

When pellets are molded by adding bauxite having a high alumina content and silica together with molten slag such as limestone to the nickel chromium-containing iron ore so that the produced slag may be adapted, for example, to the extraction of alumina and the production of alumina cement when the pellets are selectively reduced as mentioned above and are then magnetically dressed, not only metallic iron but also an effective alumina slag will be obtained.

The composition for producing such a slag may, for example, be 2 to 15% silicic acid, 35 to 65% alumina, 30 to 50% dolomite with the remainder being lime.

The reducing agent used in the present invention may be gaseous, liquid or solid.

The method of this invention is as follows:

(1) Pellets made from nickel chromium-containing iron ore are heated in a reducing oven from room temperature up to a temperature ranging from 1350° to 1500° C. within 30 minutes to 5 hours.

(2) More precisely, the heating operation is carried out in two stages:
  (a) the pellets are heated in a reducing oven from room temperature up to 1000° C. within a time ranging from 10 minutes to 4 hours, thereupon
  (b) the pellets are further heated from 1000° C. to a temperature ranging from 1350° to 1500° C. within a time from 20 minutes to one hour and 20 minutes. Then, the pellets are taken out of the reducing oven and crushed.

The time limitation in the first stage is not as critical as in the second stage. Even if the pellets are heated from room temperature to 1000° C. within any time between 10 minutes and 4 hours the separation of iron content from chromium content may be sufficiently attained, if the heating operation is carried out in the second stage as specified by the present invention. However, if the heating is conducted for more than 4 hours, it will be economically disadvantageous, and if less than 10 minutes, the reducing reaction will not favorably proceed, even if the heating operation in the next stage is done according to the present invention.

As to the time limitation in the second stage of heating the pellets within 20 minutes to one hour and 20 minutes from 1000° C. up to a temperature ranging from 1350° C. to 1500° C., it is to be noted that, if it is conducted within more than one hour and 20 minutes, it will be industrially disadvantageous and moreover carbon will be absorbed into the pellets from the circumference of the latter and chromium oxide will be reduced, but on the other hand, if below 20 minutes the reduction of iron oxide is not satisfactory, which results in an insufficient separation of the iron content from the chromium content.

The reason why the pellets are to be taken out of the reducing oven at maximum 1500° C. is that, if this temperature is exceeded, the pellets will be softened and the void in the center thereof will get out of shape, consequently there is a likelihood that the unreduced chromium oxide, which has moved into the slag, will be reduced and become admixed with the metallic iron. Thus, the object of the present invention of completely separating the iron content and the chromium content will not be obtained. If below 1350° C., the formation of hollow balls is not attained. Therefore, the heating limit in the second stage should be in the range of 1350° to 1500° C.

In the second stage, in which the pellets are heated from 1000° C. to a temperature ranging from 1350° to 1500° C. good results are obtained by heating the pellets to a temperature from 1350° to 1500° C. within one hour and 20 minutes and to a range of from 1400° to 1500° C. in a time of 20 minutes.

The upper temperature limit in the first stage or the lower limit in the second stage is not necessarily limited to 1000° C. It may be in the range of 800° to 1200° C. However, in the case of 800° C. the pellets should be heated to a temperature ranging from 1350° to 1500° C. within one hour and 20 minutes in the second stage and in the case of 1200° C. within 20 minutes.

Further, experiments were made of heating the pellets in a different temperature range, viz. between 500° to 1350° C., in the second stage. The separation of the iron component from the chromium component was effected to some degree, if the heating was conducted for a longer time. However, because of insufficient formation of hollow balls and the incomplete separation of iron and chromium components no desirable result was obtained.

According to the experiments it was confirmed to be industrially most favorable to heat the pellets from room temperature to 1000° C. within 15 minutes in the first stage and from 1000° to 1400° C. within 75 minutes in the second stage.

Further, it was discovered that the formation of hollow balls depends for the most part, upon the temperature gradient in the second stage, that is to say, upon the heating time and temperature in the second stage. Therefore, the critical point of the present invention lies in the temperature gradient in the second stage.

Of course, in practice, the heating operation in the first and second heating stages is continuous. The practical meaning of the division of two stages resides only in the different temperature gradients in both stages.

When the pellets reach a temperature of 1350° to 1500° C., they are taken out of the reducing oven and crushed. As the metallic iron is concentrated in the outer crust of each hollow ball, it is easily separated from the slag layer by crushing the pellets. When the pellets reach the above mentioned temperature range, they should be immediatly taken from the reducing oven. However, they may be practically held within a time of 30 minutes at said temperature range. If the time exceeds 30 minutes, there is a danger that the chromium oxide will be reduced and admixed with the metallic iron. It is also possible to heat the reducing oven to a certain temperature before the pellets are charged. However, the time required to reach 1000° C. should be more than 10 minutes after the pellets have been charged. A further recommendable measure is to carry out the two heating stages in two separate ovens, that is, in a low temperature oven and a high temperature oven.

The proper reducing furnace to be used in the present invention is thought to be a shaft furnace. However, by prefiring the pellets, revolving furnaces such as rotary kilns can also be used.

FIG. 1 shows a view of a pellet obtained by heating the same from room temperature to 1000° C. within 10 minutes and thereupon up to 1200° C. within 20 minutes. In this figure, 1 is a spongy iron mixed with slag and 2 a void. FIG. 2 shows a pellet obtained by heating the same from room temperature to 1000° C. within 10 minutes and thereupon up to 1300° C. within 60 minutes. In this figure 1 is metallic iron (in this case spongy iron has already disappeared) and 2 the void. As seen from this figure there are numerous small and large voids the interior of which is coated with slag. These indicate that formation of a void and a clear separation of the metallic iron layer and slag layer can not be obtained if the heating conditions in the second stage do not coincide with those specified by the present invention.

FIG. 3 shows a pellet obtained by heating in accordance with the specified conditions of the present invention. In this figure, 1 is an outer crust of metallic iron, 2 a void and 3 an inner layer of slag attached to the interior surface of 1.

Examples of the present invention are as follows:

*Example 1*

Raw pellets 10 mm. in diameter were made of a nickel chromium-containing iron ore containing 51.50% Fe, 0.72% Ni, 3.35% Cr, 1.53% $SiO_2$, 5.53% $Al_2O_3$ and 13.02% C. W. no additive was added.

The raw pellets were put into an electrically heated crucible lined with graphite and filled with coke as a reducing agent, were heated to 1000° C. within 10 minutes and thereupon to 1400° C. within 75 minutes and thereafter taken out from the crucible.

According to the result of the analysis, no chromium content was seen in the reduced metallic iron.

*Example 2*

The raw pellets of the specimen in Example 1 were put into an electrically heated crucible lined with graphite and filled with coke as a reducing agent, were heated from room temperature to 1000° C. within 10 minutes, thereupon up to 1450° C. within 50 minutes and then were taken out from the oven.

*Example 3*

The raw pellets of the specimen in Example 1 were put into a sealed rotary kiln 3.5 meter in diameter and 65 meter in length, the high temperature part of reducing temperature in which kiln had been kept at 1300° to 1450° C. by using heavy oil, together with granular coke as a reducing agent. At first the pellets were heated to 1000° C. in one hour and thereupon to said high temperature in another one hour, whereby the reducing reaction was completed. The pellets taken out from the kiln were crushed to coarse grains of several millimeters. The slag attached to the iron crust was easily separated from the latter and the metallic iron was obtained by the magnetic dressing. A trace of chromium was found in the metallic iron.

Thus, according to the present invention not only chromium contained in a nickel and chromium-containing iron ore can be simply and easily separated from the ore, but also reduced iron can be easily separated from slag by the application of the principle of the selective reduction.

What is claimed is:

1. A process for separating chromium from iron pellets containing nickel, cobalt, and chromium which comprises elevating the temperature of said pelllets in a reducing oven while in contact with a reducing agent from room temperature to about 1000° C. within 10 minutes to 4 hours, further heating said pellets to a temperature between 1350° and 1500° C. within 20 minutes to 1 hour and 20 minutes, whereby hollow balls are formed having an outer layer of reduced metallic iron, nickel and cobalt, and an inner layer of slag attached to said outer layer, said slag containing substantially all of chromium oxide, in the unreduced state, originally in said iron pellets, removing said balls from said reducing oven, crushing said balls and magnetically dressing the crushed balls, thereby separating the metallic iron, nickel, and cobalt from the chromium oxide-containing slag.

2. A process for separating chromium from iron pellets containing nickel, cobalt, and chromium which comprises elevating the temperature of said pellets in a reducing oven while in contact with a reducing agent from room temperature to 1000° C. within about 15 minutes, further heating said pellets to a temperature of about 1400° C. within about 75 minutes, whereby hollow balls are formed having an outer layer of reduced metallic iron, nickel and cobalt, and an inner layer of slag attached to said outer layer, said slag containing substantially all of chromium oxide, in the unreduced state, originally in said iron pellets, removing said balls from said reducing oven, crushing said balls and magnetically dressing the crushed balls, thereby separating the metallic iron, nickel, and cobalt from the chromium oxide-containing slag.

References Cited by the Examiner

UNITED STATES PATENTS

| | | | |
|---|---|---|---|
| 1,717,160 | 6/1929 | Kichline | 75—31 |
| 2,123,240 | 7/1938 | Hammarberg | 75—31 |

DAVID L. RECK, *Primary Examiner.*